US012620580B2

(12) United States Patent
Xie et al.

(10) Patent No.: US 12,620,580 B2
(45) Date of Patent: May 5, 2026

(54) SILICON-OXYGEN COMPOSITE ANODE MATERIAL, PREPARATION METHOD THEREOF AND LITHIUM-ION BATTERY

(71) Applicants: BTR NEW MATERIAL GROUP CO., LTD., Shenzhen (CN); Dingyuan New Energy Technology Co., LTD., Huizhou (CN)

(72) Inventors: Wei Xie, Shenzhen (CN); Chunlei Pang, Shenzhen (CN); Zhiqiang Deng, Shenzhen (CN); Jianguo Ren, Shenzhen (CN); Xueqin He, Shenzhen (CN)

(73) Assignees: BTR NEW MATERIAL GROUP CO., LTD., Shenzhen (CN); DINGYUAN NEW ENERGY TECHNOLOGY CO., LTD., Huizhou (CN)

( * ) Notice: Subject to any disclaimer, the term of this patent is extended or adjusted under 35 U.S.C. 154(b) by 824 days.

(21) Appl. No.: 17/996,334

(22) PCT Filed: Mar. 10, 2022

(86) PCT No.: PCT/CN2022/080087
§ 371 (c)(1),
(2) Date: Oct. 14, 2022

(87) PCT Pub. No.: WO2022/199389
PCT Pub. Date: Sep. 29, 2022

(65) Prior Publication Data
US 2023/0207785 A1 Jun. 29, 2023

(30) Foreign Application Priority Data
Mar. 24, 2021 (CN) .......................... 202110311665.4

(51) Int. Cl.
*H01M 4/36* (2006.01)
*H01M 4/02* (2006.01)
(Continued)

(52) U.S. Cl.
CPC ........... *H01M 4/366* (2013.01); *H01M 4/134* (2013.01); *H01M 4/382* (2013.01); *H01M 4/386* (2013.01);
(Continued)

(58) Field of Classification Search
CPC ...... H01M 4/366; H01M 4/134; H01M 4/382; H01M 4/386; H01M 4/587;
(Continued)

(56) References Cited

U.S. PATENT DOCUMENTS

2014/0057176 A1 2/2014 Park et al.
2017/0222219 A1 8/2017 Sun
(Continued)

FOREIGN PATENT DOCUMENTS

CN 102723489 A 10/2012
CN 105244488 A 1/2016
(Continued)

OTHER PUBLICATIONS

English Translation of CN111048756 (Year: 2020).*
(Continued)

*Primary Examiner* — Andrew J. Oyer
(74) *Attorney, Agent, or Firm* — McCoy Russell LLP

(57) ABSTRACT
The present application relates to a silicon-oxygen composite anode material and the preparation method thereof, and a lithium-ion battery. Wherein the silicon-oxygen composite anode material comprises a silicon-oxygen material and a composite coating layer coating the surface of the silicon-oxygen material. The composite coating layer comprises a carbon material and a lithium-containing compound, the
(Continued)

carbon material has pores, and the lithium-containing compound is filled in the pores. The silicon-oxygen composite anode material and the preparation method thereof are simple and low cost, which is also easy to conduct industrial production, moreover, the prepared silicon-oxygen composite anode material has excellent electrochemical cycle and expansion inhibition performance, which can prolong the life-span of a lithium ion battery.

13 Claims, 1 Drawing Sheet

(51) Int. Cl.
| | |
|---|---|
| *H01M 4/134* | (2010.01) |
| *H01M 4/38* | (2006.01) |
| *H01M 4/587* | (2010.01) |
| *H01M 10/0525* | (2010.01) |

(52) U.S. Cl.
CPC ....... *H01M 4/587* (2013.01); *H01M 10/0525* (2013.01); *H01M 2004/027* (2013.01)

(58) Field of Classification Search
CPC ....... H01M 10/0525; H01M 2004/027; H01M 2004/021; H01M 4/131; H01M 4/1395; H01M 4/36; H01M 4/364; H01M 4/38; H01M 4/48; H01M 4/483; H01M 4/485; H01M 4/5825; H01M 4/62; H01M 4/624; H01M 4/628; H01M 10/052; H01M 4/625; Y02E 60/10
See application file for complete search history.

(56) References Cited

U.S. PATENT DOCUMENTS

2018/0145327 A1    5/2018  Zhang et al.

2020/0058924 A1*   2/2020  Pang ..................... H01M 4/386

FOREIGN PATENT DOCUMENTS

| CN | 109428064 A | 3/2019 |
|---|---|---|
| CN | 109755500 A | 5/2019 |
| CN | 110010861 A | 7/2019 |
| CN | 111048756 A | 4/2020 |
| CN | 111326729 A | 6/2020 |
| CN | 112186188 A | 1/2021 |
| CN | 112447956 A | 3/2021 |
| CN | 113066968 A | 7/2021 |
| JP | 2014532267 A | 12/2014 |
| JP | 2015519719 A | 7/2015 |
| JP | 2016066579 A | 4/2016 |
| KR | 20170047660 A | 5/2017 |
| WO | 2021034109 A1 | 2/2021 |

OTHER PUBLICATIONS

State Intellectual Property Office of the People's Republic of China, Office Action and Search Report Issued in Application No. 202110311665.4, Dec. 10, 2021, 8 pages. (Submitted with Partial Translation).

ISA China National Intellectual Property Administration, International Search Report Issued in Application No. PCT/CN2022/080087, May 20, 2022, WIPO, 8 pages.

Japan Patent Office, Notice of Allowance Issued in Application No. 2022-562899, Apr. 2, 2024, 8 pages. (Submitted with Machine Translation).

European Patent Office, Extended European Search Report Issued in Application No. 22774051.1, Aug. 20, 2024, Germany, 10 pages.

Korean Intellectual Property Office, Notice of Allowance Issued in Application No. 10-2022-7035784, Sep. 2, 2025, 10 pages. (Submitted with Machine Translation).

* cited by examiner

Mixing a precursor with the pre-lithiated carbon-coated silicon-oxygen material, and carrying out a solid-phase thermal reaction in a protective atmosphere to obtain the silicon-oxygen composite anode material; the precursor includes at least one of a mixture of a phosphate ion-containing compound and a metal compound, a metal phosphates, a mixture of a silicate ion-containing compound and a metal compound, and a metal silicate; the silicon-oxygen composite anode material includes a silicon-oxygen material and a composite coating layer formed on the surface of the silicon-oxygen material; the composite coating layer includes a carbon material and a lithium-containing compound, the carbon material has pores, and the lithium-containing compound is filled in the pores.

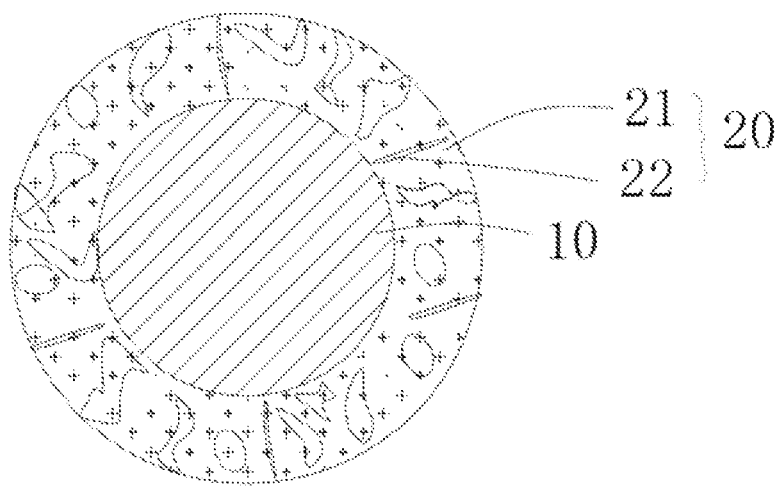

FIG. 2

SILICON-OXYGEN COMPOSITE ANODE MATERIAL, PREPARATION METHOD THEREOF AND LITHIUM-ION BATTERY

CROSS REFERENCE TO RELATED APPLICATIONS

The present application is a U.S. National Phase of International Application No. PCT/CN2022/080087, entitled "SILICON-OXYGEN COMPOSITE NEGATIVE ELECTRODE MATERIAL, PREPARATION METHOD THEREFOR, AND LITHIUM ION BATTERY", and filed on Mar. 10, 2022. International Application No. PCT/CN2022/080087 claims priority to Chinese Patent Application No. 202110311665.4 filed with on Mar. 24, 2021. The entire contents of each of the above-listed applications are hereby incorporated by reference for all purposes.

TECHNICAL FIELD

The present application relates to the field of lithium-ion battery, and to a silicon-oxygen composite anode material and the preparation method thereof, and lithium-ion battery.

BACKGROUND

Silicon monoxide material is an indispensable anode material in the new generation of ultra-large-capacity lithium-ion battery. The silicon monoxide industry has researched and deployed the silicon-based lithium-ion battery for more than ten years. However, silicon-based materials represented by silicon monoxide have not yet been used on a large scale. The main factor that limits the application of silicon monoxide materials is due to the natural disadvantages of silicon-based materials per se. High expansion, severe volume changes, and low initial coulombic efficiency are all problems that need to be solved urgently.

The control of the interface reaction is one of the important directions to inhibit the expansion of the pole piece and extend the cyclic performance of the material. It can form a coating layer on the surface of the silicon-based material to inhibit the expansion of the pole piece. At present, there are many methods to choose and improve the coating layers. For example, a single carbon material coating is a relatively conventional coating option, since the conductive carbon can improve the conductivity of the material, and different carbon layer morphologies can also affect cyclic performance. It has been reported many times in academia that the carbon coating layer doped with some other elements, such as N, P, F, etc., can improve the conductivity of the carbon layer, and meanwhile reduce the Li ion migration energy barrier and improve the Li ion migration efficiency. Titanium dioxide is also one of the common coating materials, it improves the initial coulombic efficiency and capacity to some extent. However, the high coating cost and complex coating process limit its use, and at the same time, the performance improvement doesn't make a breakthrough.

Therefore, it is still a technical problem in the field to develop a silicon-based material with excellent cyclic performance and low volumetric expansion effect, and the preparation method thereof.

SUMMARY

In view of the above-mentioned problems in the prior art, the purpose of the present application is to provide a silicon-oxygen composite anode material and the preparation method thereof, and a lithium-ion battery. The silicon-oxygen composite anode material of the present application has excellent electrochemical cycling and swelling inhibition performance, which can extend the life-span of lithium-ion batteries and reduce production costs.

In order to achieve the above-mentioned purpose of the present application, in a first aspect, the present application provides a silicon-oxygen composite anode material. The silicon-oxygen composite anode material comprises a silicon-oxygen material and a composite coating layer coating the surface of the silicon-oxygen material. The composite coating layer comprises a carbon material and a lithium-containing compound. The carbon material has pores, and the lithium-containing compound is filled in the pores.

In the above solution, the composite coating layer has a certain mechanical strength, which can ensure the integrity of the particles during lithium de-intercalation and intercalation of active silicon, inhibit particle pulverization, improve the stability of the silicon oxide material, and improve the overall cyclic performance of the finished battery. On the other hand, the lithium-containing compound in the composite coating layer isolates the silicon-oxygen material from direct contact with the electrolyte, so as to control the occurrence of additional side reactions between the electrolyte and the silicon-oxygen material. Finally, the composite coating layer ensures good electrical conductivity, which can greatly improve the ability of active silicon oxide to obtain electrons, improve the efficiency of lithium de-intercalation and intercalation of the silicon oxide material, and promote the capacity utilization and the deep lithium intercalation.

The present application also provides a silicon-oxygen composite anode material. The silicon-oxygen composite anode material comprises a silicon-oxygen material and a composite coating layer coating the surface of the silicon-oxygen material. The composite coating layer comprises a carbon material and a lithium-containing compound, and the lithium-containing compound is distributed inside of carbon material.

In a possible embodiment, the chemical formula of silicon-oxygen material is $SiO_n$, where $0.5 \leq n \leq 1.5$.

In a possible embodiment, the average particle size of the silica material is 3.5 μm to 8.0 μm.

In a possible embodiment, the thickness of the composite coating layer is 1 nm to 150 nm.

In a possible embodiment, based on 100% of the mass of silicon-oxygen composite anode material, the mass amount of the lithium-containing compound accounts for 0.1% to 10.0%.

In a possible embodiment, the morphology of the lithium-containing compound includes at least one of granular, flocculent and fibrous.

In a possible embodiment, the average particle size of the lithium-containing compound is 1 nm to 80 nm.

In a possible embodiment, the lithium-containing compound includes at least one of lithium phosphate, lithium silicate, and lithium-containing metal oxide.

In a possible embodiment, the lithium-containing compound includes at least one of multi-lithium phosphate, multi-lithium silicate, and multi-lithium-containing metal oxide.

In a possible embodiment, the multi-lithium phosphate includes $Li_xR_yM_zPO_4$, where R is at least one selected from the group consisting of Mg, V and Cr, and M is at least one selected from the group consisting of Al, Sc, Ti, Cu, Zn, Y, Mo, Nb, La and Zr, $0.3 \leq x \leq 1.2$, $0.5 \leq y \leq 1.0$, and $0 \leq z \leq 0.2$.

In a possible embodiment, the multi-lithium silicate includes $Li_xR_yM_zSiO_4$, where R is at least one selected from the group consisting of Mg, V and Cr, and M is at least one selected from the group consisting of Al, Sc, Ti, Cu, Zn, Y, Mo, Nb, La and Zr, 0.8≤x≤2.2, 0.8≤y≤1.2, and 0≤z≤0.2.

In a possible embodiment, the multi-lithium-containing metal oxide includes $Li_xR_yM_zO_2$, where R is at least one selected from the group consisting of Al, V and Cr, and M is at least one selected from the group consisting of Mg, Sc, Ti, Cu, Zn, Y, Mo, Nb, La and Zr, 0.3≤x≤0.7, 0.2≤y≤5, and 0≤z≤0.2.

In a possible embodiment, the tap density of the silicon-oxygen composite anode material is 0.7 g/cm³ to 1.2 g/cm³.

In a possible embodiment, the specific surface area of the silicon-oxygen composite anode material is 1.50 m²/g to 5.00 m²/g.

In a possible embodiment, the porosity of the silicon-oxygen composite anode material is 0.5% to 15.0%.

In a possible embodiment, the porosity of the composite coating layer is 0.5% to 15%.

In a possible embodiment, the average particle size of the silicon-oxygen composite anode material is 1.0 μm to 12.0 μm.

In a possible embodiment, the mass percentage content of carbon in the silicon-oxygen composite anode material is 3.0% to 6.0%.

In a possible embodiment, the pH of the silicon-oxygen composite anode material is 10.0 to 12.0.

In a second aspect, the present application provides a method of preparing the silicon-oxygen composite anode material, including:

Mixing a precursor with the pre-lithiated carbon-coated silicon-oxygen material, and carrying out a solid-phase thermal reaction in a protective atmosphere to obtain the silicon-oxygen composite anode material; where the precursor includes at least one of a mixture of a phosphate containing ionic compound and a metal compound, a metal phosphate, a mixture of a silicate containing ionic compound and a metal compound, and a metal silicate; the silicon-oxygen composite anode material includes a silicon-oxygen material and a composite coating layer formed on the surface of the silicon-oxygen material; the composite coating layer includes a carbon material and a lithium-containing compound, the carbon material has pores, and the lithium-containing compound is filled in the pores.

In the above solution, for the silicon-oxygen composite anode material provided by the present application, the residual alkali (LiOH, etc.) on the surface during the pre-lithiumation process is compounded with the precursor to obtain the lithium-containing compound, which is filled in the pores of the coating layer, where the lithium-containing compound is stable in water-based or oil-based solvents (insoluble, non-reactive), thus the lithium-containing compounds and carbon materials are constructed to form the composite coating layer of silicon-oxygen materials. The composite coating layer can stabilize Li, reduce the pH of the solvent, and weak the influence of the lithium source on the solvent while maintaining high initial effect, thereby improving the stability of the slurry during processing. The generated lithium-containing compound includes lithium silicate (lithium metasilicate), lithium phosphate, metallic acid salt, etc. The generated lithium-containing compound replaces the lithium source initially filled in the pores, which realizes a through lithium-ion channel, enhancing the migration efficiency of the lithium-ion and the conductivity, and connecting the silicon-oxide material with the electrolyte. The other advantages of anode material are maintained, while improving the processing performance. Furthermore, the generated stable lithium-containing compound is embedded in the pores of the carbon layer to fill gaps of the coating layer, which physically cuts off the contact between the silicon oxide material and the alkaline solvent, inhibits gas generation, and prevents the occurrence of capacity loss.

In a possible embodiment, the lithium-containing compound includes at least one of multi-lithium phosphate, multi-lithium silicate, and multi-lithium-containing metal oxide.

In a possible embodiment, the multi-lithium phosphate includes $Li_xR_yM_zPO_4$, where R is at least one selected from the group consisting of Mg, V and Cr, and M is at least one selected from the group consisting of Al, Sc, Ti, Cu, Zn, Y, Mo, Nb, La and Zr, 0.3≤x≤1.2, 0.5≤y≤1.0, and 0≤z≤0.2.

In a possible embodiment, the multi-lithium silicate includes $Li_xR_yM_zSiO_4$, where R is at least one selected from the group consisting of Mg, V and Cr, and M is at least one selected from the group consisting of Al, Sc, Ti, Cu, Zn, Y, Mo, Nb, La and Zr, 0.8≤x≤2.2, 0.8≤y≤1.2, and 0≤z≤0.2.

In a possible embodiment, the multi-lithium-containing metal oxide includes $Li_xR_yM_zO_2$, where R is at least one selected from the group consisting of Al, V and Cr, and M is at least one selected from the group consisting of Mg, Sc, Ti, Cu, Zn, Y, Mo, Nb, La and Zr, 0.3≤x≤0.7, 0.2≤y≤5, and 0≤z≤0.2.

In a possible embodiment, the pre-lithiated carbon-coated silicon-oxygen material is obtained by the reaction of a carbon-coated silicon-oxygen material with a lithium source.

In a possible embodiment, the lithium source includes at least one of lithium hydride, alkyl lithium, metal lithium, lithium aluminum hydride, lithium amide, and lithium borohydride.

In a possible embodiment, the reaction temperature between the carbon-coated silicon-oxygen material and the lithium source is 150° C. to 300° C.

In a possible embodiment, the reaction time between the carbon-coated silicon-oxygen material and the lithium source is 2.0 h to 6.0 h.

In a possible embodiment, the mass ratio of the carbon-coated silicon-oxygen material to the lithium source is 1:(0.01-0.20).

In a possible embodiment, the mass percentage content of lithium in the pre-lithiated carbon-coated silicon-oxygen material is 1.0% to 20%.

In a possible embodiment, the method also includes coating the silicon-oxygen material with carbon to obtain the carbon-coated silicon-oxygen material.

In a possible embodiment, the chemical formula of the silicon-oxygen material is $SiO_n$, where 0.5≤n≤1.5.

In a possible embodiment, the average particle size of the silica material is 3.5 μm to 8.0 μm.

In a possible embodiment, the thickness of the carbon coating layer on the surface of the silicon-oxygen material is 1 nm to 150 nm.

In a possible embodiment, the carbon coating includes gas-phase carbon coating, the conditions for gas-phase carbon coating are as follows: raising the temperature of the silicon-oxygen material to 600° C. to 1000° C. under protective atmosphere, feeding organic carbon source gas, keeping the temperature for 0.5 h to 10 h and then cooling down. Where, the organic carbon source gas includes hydrocarbons, and the hydrocarbons includes at least one of methane, ethylene, ethyne, and benzene.

In a possible embodiment, the carbon coating includes solid-phase carbon coating, the conditions for solid-phase carbon coating are as follows: after 0.5 h to 2 h of the fusion of the silicon-oxygen material with a carbon source, carbonizing the obtained carbon mixture under the temperature of 600° C. to 1000° C. for 2 h to 6 h and then cooling down. Where, the carbon source includes at least one of polymer, saccharides, organic acid and pitch.

In a possible embodiment, the phosphate containing ionic compound is at least one selected from the group consisting of phosphoric acid, phosphate and metaphosphate.

In a possible embodiment, the silicate containing ionic compound is at least one selected from the group consisting of silicic acid, silicate and silicon dioxide.

In a possible embodiment, the metal compound includes metal oxides and/or soluble metal salts.

In a possible embodiment, the molar ratio of the phosphate containing ionic compound to the metal compound is 1:(0.05 to 1.20).

In a possible embodiment, the molar ratio of the silicate containing ionic compound to the metal compound is 1:(0.05 to 1.20).

In a possible embodiment, the conditions for obtaining the mixture of the phosphate containing ionic compound and the metal compound or the mixture of the silicate containing ionic compound and the metal compound are as follows: controlling the mixing temperature to be 20° C. to 80° C., and the mixing time to be 3 h to 6 h.

In a possible embodiment, the conditions for obtaining the mixture of the phosphate containing ionic compound and the metal compound or the mixture of the silicate containing ionic compound and the metal compound are as follows: dispersing the mixture by at least one of ultrasonic dispersion, stirring dispersion, and wet ball-milling dispersion.

In a possible embodiment, the method to obtain the mixture of the silicate containing ionic compound and the metal compound, or the mixture of the phosphate containing ionic compound and the metal compound is wet ball-milling dispersion.

In a possible embodiment, the average particle size of the precursor particles is 1 nm to 400 nm.

In a possible embodiment, the average particle size of the precursor particles is 1 nm to 50 nm.

In a possible embodiment, the steps of mixing a precursor with the pre-lithiated carbon-coated silicon-oxygen material includes: dispersing the precursor in a solvent to form a suspension, then adding the pre-lithiated carbon-coated silicon-oxygen material to the suspension, dispersing adequately and removing the solvent.

In a possible embodiment, the method of dispersing adequately is wet ball-milling dispersion.

In a possible embodiment, the mass ratio of the precursor to the pre-lithiated carbon-coated silicon-oxygen material is (0.005 to 0.1):1.

In a possible embodiment, the mass ratio of the added solvent to the sum of the precursor and the pre-lithiated carbon-coated silicon-oxygen material is 0.3 to 1.0.

In a possible embodiment, the solvent includes at least one of ethyl alcohol, acetone, dioctyl ether, hexadecane, tetraethylene glycol dimethyl ether, and trioctylamine.

In a possible embodiment, gas creating the protective atmosphere includes at least one of nitrogen, helium, neon, argon, krypton and xenon.

In a possible embodiment, the temperature of the solid-phase thermal reaction is 500° C. to 1300° C.

In a possible embodiment, the temperature of the solid-phase thermal reaction is 700° C. to 1050° C.

In a possible embodiment, the time for the solid-phase thermal reaction is 3 h to 10 h.

In a possible embodiment, the heating rate of the solid-phase thermal reaction is 1° C./min to 5° C./min.

In a possible embodiment, the method also includes: screening the products of the solid-phase thermal reaction to obtain the silicon-oxygen composite anode material, where the screening includes at least one of crushing, ball milling, filtering, or pneumatic classification.

In a third aspect, the present application provides a lithium-ion battery comprising the silicon-oxygen composite anode material described in the first aspect or prepared according to the method for preparing the silicon-oxygen composite anode material described in the second aspect.

Compared with the prior art, the present application has the following advantages:

The silicon-oxygen composite anode material in the present application comprises a silicon-oxygen material and a composite coating layer coating the surface of the silicon-oxygen material. The composite coating layer comprises a carbon material and a lithium-containing compound, the carbon material has pores, and the lithium-containing compound is filled in the pores. Where the composite coating layer has a stable structure, which can prevent the active material and electrolyte from being separated without hindering the diffusion of lithium ions, thereby controlling the generation of SEI, preventing its excessive deposition, and also preventing the loss of silicon oxide materials and active lithium, To increase the initial capacity of the material, and the suppressed SEI excessive deposition can effectively control the expansion of the circulating pole piece, and effectively improve the cyclic performance of silicon-based materials.

The lithium-containing compound in the composite coating layer replaces the lithium source initially filled in the pores, which realizes a through lithium-ion channel, enhancing the conductivity, and connecting the silicon-oxide materials with the electrolyte. Furthermore, the lithium-containing compound is stable (insoluble, non-reactive) in an aqueous or oil-based solvent, so that the lithium-containing compound and the carbon material are constructed to form a composite coating layer of silicon-oxygen material, which can not only maintain the high initial efficiency but meanwhile stabilize Li, reduce the pH value of the solvent, and weaken the influence of the lithium source on the solvent, thereby improving the stability of the medium slurry during processing process.

In another aspect, the present application provides a method of preparing the silicon-oxygen composite anode material, which includes mixing a precursor with the pre-lithiated carbon-coated silicon-oxygen material, carrying out a solid-phase thermal reaction in a protective atmosphere to obtain the silicon-oxygen composite anode material. In the above-mentioned preparation method, the lithium source filled in the composite coating layer and the precursor are compounded to obtain the lithium-containing compound, the generated stable lithium-containing compound is embedded in the pores of the carbon layer to overcome defects of the coating layer, which physically cuts off the contact between the silicon oxide material and the alkaline solvent, inhibits gas generation, and prevents the occurrence of capacity loss.

BRIEF DESCRIPTION OF DRAWINGS

FIG. 1 is a structure diagram of the silicon-oxygen composite anode material provided by the present application.

FIG. 2 is a process flow diagram of the method of preparing the silicon-oxygen composite anode material provided by the present application.

DESCRIPTION OF EMBODIMENTS

The present disclosure will be described in further detail below, in order to provide a better illustration of the present disclosure and facilitate the understanding of the technical solutions of the present disclosure. However, the following embodiments are merely simple examples of the present disclosure and are not intended to represent or limit the scope of protection of the present disclosure. The scope of protection of the present disclosure is defined by the claims.

In a first aspect, the present application provides a silicon-oxygen composite anode material, which is based on a core-shell structure, just as shown in FIG. 1, the core is a silicon-oxygen material 10, and the shell is a composite coating layer 20. Where, the lithium-containing compound and the carbon material are constructed to form a composite coating layer, which prevents the silicon-oxygen material from swelling and has good conductivity on the premise of ensuring the lithium-ion channel.

The silicon-oxygen composite anode material includes a silicon-oxygen material and a composite coating layer formed on the surface of the silicon-oxygen material. The composite coating layer 20 includes a carbon material 21 and a lithium-containing compound 22, the carbon material has pores, and the lithium-containing compound is filled in the pores.

In the above solution, the composite coating layer has a certain mechanical strength, which can ensure the integrity of the particles during lithium de-intercalation and intercalation of active silicon, inhibit particle pulverization, improve the stability of the silicon oxide material, and improve the overall cyclic performance of the finished battery. On the other hand, the lithium-containing compound in the composite coating layer isolates the silicon-oxygen material from direct contact with the electrolyte, and controls the occurrence of additional side reactions between the electrolyte and the silicon-oxygen material, without reducing the capacity of lithium intercalation. Finally, the composite coating layer ensures a good electrical conductivity, which can greatly improve the ability of active silicon oxide to obtain electrons, improve the efficiency of lithium de-intercalation and intercalation of the silicon oxide material, and promote the capacity utilization and the deep lithium intercalation, as well as increase the cycle efficiency and the initial coulombic efficiency.

The followings are preferred technical solutions of the present application, but it doesn't mean a limitation to technical solutions provided by the present application. Through the following preferred technical solutions, we can better achieve the technical objectives and realize the beneficial effects of the present application.

In some embodiments, the silicon-oxygen material is $SiO_n$, where $0.5 \leq n \leq 1.5$, more specifically, it may be $SiO_{0.5}$, $SiO_{0.8}$, $SiO_{0.9}$, SiO, $SiO_{1.1}$, $SiO_{1.2}$ or $SiO_{1.5}$, etc. Preferably, the silicon oxide material is SiO. The composition of $SiO_n$ is relatively complicated, and it can be understood as being formed by uniformly dispersing of nano-silicon in $SiO_2$.

In some embodiments, the average particle size ($D_{50}$) of the silicon oxide material is 3.5 μm to 8.0 μm; more specifically, it may be but not limited to 3.5 μm, 4.0 μm, 4.5 μm, 5.0 μm, 5.5 μm, 6.0 μm, 6.5 μm. μm, 7.0 μm, 7.5 μm or 8.0 μm, etc., other unlisted values within the range are also applicable. Understandably, it can ensure adequate reactions between the silicon oxide material and the silicic acid source or other metal source by controlling the particle size of the silicon-oxygen material within the above-mentioned range. Moreover, proper particle diameter is beneficial to improve the uniformity of the mixture, and thereby avoid partially generating silicate metal salt with excessive or deficient lithium, proper particle size also has advantages for displaying follow-up performance, and thereby avoid the problem of cycle stability caused by uneven distribution, which is beneficial to improve the cycle stability and rate capability of the anode material.

In some embodiments, the thickness of the composite coating layer is 1 nm to 150 nm, more specifically, it can be but not limited to 1 nm, 5 nm, 10 nm, 20 nm, 50 nm, 60 nm, 70 nm, 80 nm, 90 nm, 100 nm, 120 nm or 150 nm etc., other unlisted values within this range are also applicable. Understandably, if the composite coating layer is too thick, the transmission efficiency of the lithium-ion will be reduced, which is disadvantageous for large-rate charging and discharging of the material, and the overall performance of the anode material will be reduced. If the composite coating layer is too thin, it will be disadvantageous for increasing the conductivity of the anode material, and the volumetric expansion inhibition performance for the material will be weak, resulting in a poor long-cyclic performance.

In some embodiments, the lithium-containing compound can also be distributed inside of the carbon material. Specifically, it can be distributed in the pores of the carbon material.

In some embodiments, the carbon material includes at least one of the hard carbon, soft carbon, carbon nanotubes, carbon nanofibers, graphite, and graphene.

In some embodiments, the mass percentage of the lithium-containing compound in the silicon-oxygen composite anode material is 0.1% to 10%; Specifically, it can be but not limited to 0.1%, 0.5%, 0.8%, 1%, 2%, 3%, 4%, 5%, 6%, 7%, 8%, or 10% etc.

The morphology of the lithium-containing compound includes at least one of granular, flocculent and fibrous, it can also be other irregular particles. The average particle diameter of the lithium-containing compound particles is 1 nm to 80 nm, more specifically, it can be but not limited to 1 nm, 5 nm, 10 nm, 20 nm, 50 nm, 60 nm, 70 nm or 80 nm, other unlisted values within the range are also applicable. It is beneficial for the lithium-containing compound to effectively fill the pores of the coated carbon layer and be uniformly dispersed in the carbon layer by controlling the particle size of the lithium-containing compound particles within the above-mentioned range.

In some embodiments, the lithium-containing compound includes at least one of lithium phosphate, lithium silicate, and lithium-containing metal oxide.

In some embodiments, the lithium-containing compound includes at least one of multi-lithium phosphate, multi-lithium silicate, and multi-lithium-containing metal oxide.

The above-mentioned multi-element means the lithium-containing compound includes at least one of other metal ions in addition to the lithium-ion. It enhances the conductivity of the material and improve the cyclic capacity by bringing in other metal ions.

In some embodiments, the multi-lithium phosphate includes $Li_xR_yM_zPO_4$, where R is at least one selected from the group consisting of Mg, V and Cr, and M is at least one selected from the group consisting of Al, Sc, Ti, Cu, Zn, Y, Mo, Nb, La and Zr, $0.3 \leq x \leq 1.2$, $0.5 \leq y \leq 1.0$, $0 \leq z \leq 0.2$.

In some embodiments, the multi-lithium silicate includes $Li_xR_yM_zSiO_4$, where R is at least one selected from the group consisting of Mg, V and Cr, and M is at least one selected from the group consisting of Al, Sc, Ti, Cu, Zn, Y, Mo, Nb, La and Zr, $0.8 \leq x \leq 2.2$, $0.8 \leq y \leq 1.2$, $0 \leq z \leq 0.2$.

In some embodiments, the multi-lithium-containing metal oxide includes $Li_xR_yM_zO_2$, where R is at least one selected from the group consisting of Al, V and Cr, and M is at least one selected from the group consisting of Mg, Sc, Ti, Cu, Zn, Y, Mo, Nb, La and Zr. $0.3 \leq x \leq 0.7$, $0.2 \leq y \leq 5$, $0 \leq z \leq 0.2$ The specific surface area of the silicon-oxygen composite anode material is 1.50 m²/g to 5.00 m²/g; specifically, it can be but not limited to 1.50 m²/g, 2.00 m²/g, 2.50 m²/g, 3.00 m²/g, 3.50 m²/g, 4.00 m²/g, 4.50 m²/g or 5.00 m²/g, etc., other unlisted values within this range are also applicable. By controlling the specific surface area of the silicon-oxygen composite anode material within the above-mentioned range, it can ensure the processibility of the material and is beneficial to improve the initial efficiency of the lithium battery made of the anode material, as well as the cyclic performance of the anode material.

In some embodiments, the average particle size of the silicon-oxygen composite anode material is 1.0 μm to 12.0 μm, and specifically it can be 1.0 μm, 2.0 μm, 3.0 μm, 4.0 μm, 6.5 μm, 7.0 μm, 8.2 μm, 9.5 μm, 10.0 μm or 12.0 etc. It is beneficial to improve the cyclic performance of the anode material by controlling the average particle size of the silicon-oxygen composite anode material within the above-mentioned range. Preferably, the average particle size of the silicon-oxygen composite anode material is 4.0 μm to 7.0 μm.

In some embodiments, the tap density of the silicon-oxygen composite anode material is 0.7 g/cm3 to 1.2 g/cm3; specifically, it can be but not limited to 0.7 g/cm3, 0.75 g/cm3, 0.8 g/cm3, 0.85 g/cm3, 0.9 g/cm3, 0.95 g/cm3, 1.0 g/cm3, 1.1 g/cm3 or 1.2 g/cm3, etc., other unlisted values within this range are also applicable. It is beneficial to increase the energy density of the lithium battery which is made of the anode material by controlling the tap density of the silicon-oxygen composite anode material within the above-mentioned range.

In some embodiments, the porosity of the silicon-oxygen composite anode material is 0.5% to 15.0%; specifically, it can be but not limited to 0.5%, 1.0%, 2.0%, 3%, 4%, 5%, 6%, 7%, 8%, 9%, 10%, 11%, 12%, 13%, 14% or 15%, etc., other unlisted values within this range are also applicable. It will enable the material to have good rate performance by controlling the porosity of the silicon-oxygen composite anode material within the above-mentioned range.

In some embodiments, the porosity of the composite coating layer is 0.5% to 15.0%; specifically, it can be but not limited to 0.5%, 1.0%, 2.0%, 3%, 4%, 5%, 6%, 7%, 8%, 9%, 10%, 11%, 12%, 13%, 14% or 15%, etc., other unlisted values within this range are also applicable.

In some embodiments, the mass percentage content of the carbon in the silicon-oxygen composite anode material is 3.0% to 6.0%; specifically, it can be but not limited to 3.0%, 3.5%, 4.0%, 4.5%, 5%, 5.5% or 6%, etc., other unlisted values within this range are also applicable. If the carbon content is too high, the transmission efficiency of the lithium-ion will be reduced, which is not conducive to large-rate charging and discharging of the material, and reduces the overall performance of the anode material. While if the carbon content is too low, it will be not conducive to increase the conductivity of the anode material and will have weak inhibition of the volumetric expansion of the material, which will lead to price difference of long cyclic performance.

In some embodiments, the pH value of the silicon-oxygen composite anode material is 10.0 to 12.0, more specifically, it can be 10.0, 10.3, 10.5, 10.8, 11.0, 11.3, 11.5, 11.8, 12.0 etc. Understandably, it can effectively reduce the alkalinity of the material, improve the water processing performance of the material, and increase the initial effect of the anode material by using the lithium-containing compounds to fill the carbon material.

In a second aspect, as shown in FIG. 2, the present application provides a method for preparing a silicon-oxygen composite anode material, including:

S100, mixing a precursor with the pre-lithiated carbon-coated silicon-oxygen material, and carrying out a solid-phase thermal reaction in a protective atmosphere to obtain the silicon-oxygen composite anode material; The precursor includes at least one of a mixture of a phosphate containing ionic compound and a metal compound, a metal phosphates, a mixture of a silicate containing ionic compound and a metal compound, and a metal silicate; The silicon-oxygen composite anode material includes a silicon-oxygen material and a composite coating layer formed on the surface of the silicon-oxygen material. The composite coating layer includes a carbon material and a lithium-containing compound, the carbon material has pores, and the lithium-containing compound is filled in the pores.

In the above solution, the silicon-oxygen composite anode material is obtained by mixing the precursor with the pre-lithiated carbon-coated silicon-oxygen material, and carrying out a solid-phase thermal reaction in a protective atmosphere. A lithium-containing compound can be obtained by synthesizing the precursor and the lithium source filled in the composite coating layer with the above-mentioned preparation method. The generated stable lithium-containing compound is embedded in the pores of the carbon layer to overcome defects of the coating layer, which physically cuts off the contact between the silicon oxide material and the alkaline solvent, inhibits gas generation, and prevents the occurrence of capacity loss.

The preparation method provided by this solution will be further introduced in details as follows:

Before step S100, the preparation method further includes:

Coating the silicon-oxygen material with carbon to obtain the carbon-coated silicon-oxygen material.

Understandably, carbon coating is performed on the silicon-oxygen material. Since the carbon coating layer is relatively loose and there are a large number of micropores, and subsequent lithium sources can pass through the micropores of the carbon coating layer and penetrate the layer reacting on the surface of the silicon-oxygen material, so the carbon coating layer is still located in the outermost layer in the finally obtained silicon-oxygen composite anode material.

In some embodiments, the carbon coating includes carbon coating in gas-phase and/or in solid-phase.

In some embodiments, when carbon coating in gas-phase is adopted, the silicon-oxygen material is heated to 600° C. to 1000° C. in a protective atmosphere, and an organic carbon source gas is introduced, and the temperature is kept for 0.5 h to 10 h and then cooling down.

In some embodiments, the organic carbon source gas includes hydrocarbons, and the hydrocarbons include at least one of methane, ethylene, acetylene, and benzene.

In some embodiments, when carbon coating in solid-phase is adopted, the carbon material to be coated is fused with the carbon source for 0.5 h to 2 h, and the obtained carbon mixture is carbonized at 600° C. to 1000° C. for 2 h to 6 h, then cooling down.

In some embodiments, the carbon source includes at least one of polymer, saccharides, organic acid and pitch.

Further, before step S100, the preparation method also includes:

Reacting the carbon-coated silicon-oxygen material a lithium source to obtain a pre-lithiated carbon-coated silicon-oxygen material.

In some embodiments, the silicon-oxygen material is $SiO_n$, where $0.5 \leq n \leq 1.5$, more specifically, it can be for example, $SiO_{0.5}$, $SiO_{0.6}$, $SiO_{0.7}$, $SiO_{0.5}$, $SiO_{0.9}$, SiO, $SiO_{1.1}$, $SiO_{1.2}$ or $SiO_{1.5}$, etc. Preferably, the silicon oxide material is SiO.

In some embodiments, the average particle size ($D_{50}$) of the carbon-coated silicon-oxygen material is 3.5 μm to 8.0 μm; specifically, it can be but not limited to 3.5 μm, 4.0 μm, 4.5 μm, 5.0 μm, 5.5 μm, and 6.0 μm. μm, 6.5 μm, 7.0 μm, 7.5 μm or 8.0 μm, etc., other unlisted values within this range are also applicable. Understandably, it can avoid the cycle stability problems caused by the type and uneven distribution of lithiated silicate products, and is beneficial to improve the structural stability, thermal stability and long-cycle stability of the anode material by controlling the particle size of the carbon-coated silica material within the above-mentioned range.

Specifically, the thickness of the carbon coating layer on the surface of the silicon-oxygen material is 1 nm to 150 nm, more specifically, it can be but not limited to 1 nm, 5 nm, 10 nm, 20 nm, 50 nm, 60 nm, 70 nm, 80 nm, 90 nm, 100 nm, 120 nm, or 150 nm, and other unlisted values within this range are also applicable. Understandably, if the composite coating layer is too thick, the transmission efficiency of the lithium-ion will be reduced, which is disadvantageous for large-rate charging and discharging of the material, and the overall performance of the anode material will be reduced. If the composite coating layer is too thin, it will be disadvantageous for increasing the conductivity of the anode material, and the volumetric expansion inhibition performance for the material will be weak, resulting in a poor long-cyclic performance.

In some embodiments, the lithium source includes at least one of lithium hydride, alkyl lithium, metal lithium, lithium aluminum hydride, lithium amide, and lithium borohydride.

Specifically, the reaction temperature between the carbon-coated silicon-oxygen material and the lithium source is 150° C. to 300° C., specifically it can be 150° C., 170° C., 180° C., 200° C., 220° C., 250° C., 280° C., or 300° C., etc.; The reaction time is 2.0 h to 6.0 h, specifically it can be 2.0 h, 2.5 h, 3.0 h, 3.5 h, 4.0 h, 4.5 h, 5.0 h, 5.5 h or 6.0 h, etc.; By controlling the reaction temperature and reaction time, most of the lithium source enters into the silicon-oxygen material particles to form the Li—SiO material, and the rest of the lithium source is deposited on the surface of the silicon-oxygen material and undergoes a reduction reaction with the silicon-oxygen material to produce lithium oxide or lithium hydroxide, these lithium oxide or lithium hydroxide are filled in the pores of the carbon coating layer on the surface of the silicon-oxygen material.

In some embodiments, the mass ratio of the carbon-coated silicon-oxygen material $SiO_n$ to the lithium source is 1:(0.01-0.20), more specifically, it can be but not limited to 1:0.01, 1:0.03, 1:0.05, 1:0.1, 1:0.15, 1:0.2 etc., and other unlisted values within this range are also applicable.

In some embodiments, the mass percentage content of the lithium in the pre-lithiated carbon-coated silicon-oxygen material is 1.0% to 20.0%, specifically it can be but not limited to 1%, 3%, 5%, 8%, 10%, 12%, 15%, 18% or 20% etc., and other unlisted values within this range are also applicable.

In some embodiments, the mass percentage content of the lithium in the pre-lithiated carbon-coated silicon-oxygen material is 3% to 20%; After many trials, it is found that neither too high nor too low lithium content in the carbon-coated silicon-oxygen material after pre-lithiation is beneficial for the full reaction of the lithium oxide or lithium hydroxide embedded in the silicon oxide material with the precursor to generate a stable lithium-containing compound to cut off the contact between the silicon oxide material and the alkaline solvent, and inhibit the phenomenon of gas production.

Further, before step S100, the preparation method also includes:

Mixing a phosphate containing ionic compound or a silicate containing ionic compound with a metal compound to obtain a mixture of the phosphate containing ionic compound and the metal compound, or a mixture of the silicate containing ionic compound and the metal compound.

In some embodiments, the phosphate containing ionic compound is at least one selected from the group consisting of the phosphoric acid, phosphate, and metaphosphate. The silicate containing ionic compound is at least one selected from the group consisting of the silicic acid, silicate, and silicon dioxide. Understandably, phosphate ions and silicate ions have good lithium-ion conductivity, which can improve the electrochemical performance of the anode material.

In some embodiments, the molar ratio of the phosphate containing ionic compound to the metal compound is 1:(0.05 to 1.20), specifically it can be but not limited to 1:0.05, 1:0.08, 1:0.1, 1:0.2, 1:0.5, 1:0.8, 1:1, 1:1.1 or 1:1.2 etc. Similarly the molar ratio of the silicate containing ionic compound to the metal compound is 1:(0.05 to 1.20).

The metal compound includes a metal oxide and/or a soluble metal salt, where the metal compound can be a metal compound of a single metal element and/or a polymetal element, and for example, the metal oxide or a soluble metal salt of a single metal element can be titanium oxide, magnesium oxide, vanadium oxide, aluminum oxide, zinc oxide, chromium oxide, copper oxide, tin oxide, and rare earth metal oxides, and the soluble metal salts can be chlorides, nitrates, etc. of the above samples; The metal oxide or the combination of soluble metal salts of polymetallic elements can include binary metal combinations, ternary metal combinations, etc., the above-mentioned metals can be arbitrarily selected and matched in different proportions.

In some embodiments, the phosphate containing ionic compound or a silicate containing ionic compound together with a metal compound can be added to water for dispersion, mixing, and drying to obtain a corresponding mixture, that is, the precursor.

The mixing treatment can adopt at least one of the ultrasonic dispersion, stirring dispersion, and wet ball-milling dispersion. In one embodiment, the stirring dispersion method is adopted, the mixing temperature is controlled to be 20° C. to 80° C., and the mixing time is 3 h to 6 h, in order to ensure that all components are fully and uniformly dispersed. In another embodiment, the wet ball milling dispersion method is adopted, the grinding time is 3 minutes to 6 hours, and the ball-to-material ratio is 2:1, in order to ensure that all components are fully and uniformly dispersed.

The drying treatment method can be, for example, oven drying, spray drying, vacuum drying, freeze drying, etc. In this embodiment, the oven drying method is adopted, and the drying temperature is 80° C. to 100° C., and the drying time is 12 to 24 hours. The precursor is obtained after drying.

In some embodiments, the phosphate containing ionic compound or the silicate containing ionic compound and the metal compound can also be mixed by dry ball milling to obtain the corresponding mixture, that is, the precursor.

Specifically, the phosphate containing ionic compound or the silicate containing ionic compound and the metal compound are mixed by ball milling to obtain the precursor.

In some embodiments, the average particle size of the precursor particles is 1 nm to 400 nm, specifically it can be but not limited to 1 nm, 5 nm, 10 nm, 15 nm, 20 nm, 25 nm, 30 nm, 35 nm, 40 nm, 45 nm, 50 nm, 100 nm, 200 nm, 300 nm or 400 nm, etc., other unlisted values within this range are also applicable. Understandably, by controlling the particle size of the precursor, it can be advantageous for the precursor to pass through the pores of the carbon coating layer to react with the lithium oxide or lithium hydroxide in the pores. Preferably, the average particle size of the precursor particles is 1 nm to 50 nm.

In some embodiments, the precursor can also be metal phosphate or metal silicate. Specifically, the metal phosphate can be $Li_3PO_4$, $LiTi_2(PO_4)_3$, $Li_3V_2(PO_4)_3$, $Li_3VCr(PO_4)_3$ etc., and the metal silicate can be $VSiO_4$, $Li_2MgSiO_4$ etc., which are not limited here.

S100, mixing a precursor with the pre-lithiated carbon-coated silicon-oxygen material, and perform a solid-phase thermal reaction in a protective atmosphere to obtain the silicon-oxygen composite anode material.

In some embodiments, the steps of mixing a precursor with the pre-lithiated carbon-coated silicon-oxygen material includes: dispersing the precursor in a solvent to form a suspension, then adding the pre-lithiated carbon-coated silicon-oxygen material to the suspension, dispersing adequately and removing the solvent. The method of dispersing adequately is wet ball-milling dispersion.

In some embodiments, the mass ratio of the precursor to the pre-lithiated carbon-coated silicon-oxygen material is (0.005 to 0.1):1. After many tests, it is found that when the mass ratio is too high, it means the precursor content is excessive, and the cost increases; when the mass ratio is too low, it means the precursor content is deficient, and the precursor cannot be fully filled in the pores of the carbon coating layer, which is disadvantageous for the precursor to pass through the pores of the carbon coating layer to react with the lithium oxide or lithium hydroxide in the pores, meanwhile it causes the residual lithium oxide or lithium hydroxide in the carbon coating layer to contact with water and generate strong alkaline by-products, increasing the alkalinity of the material, and causing serious gas production during the charging and discharging process of the battery, thereby the initial effect and cycle stability of the battery will decrease.

Optionally, the mass ratio of the precursor to the pre-lithiated carbon-coated silicon-oxygen material can specifically be but not limited to 0.005:1, 0.008:1, 0.01:1, 0.02:1, 0.04:1, 0.05:1, and 0.06:1, 0.07:1, 0.08:1, 0.09:1, or 0.1:1, etc., and other unlisted values within this range are also applicable.

In some embodiments, the mass ratio of the added solvent to the sum of the precursor and the pre-lithiated carbon-coated silicon-oxygen material is (0.3 to 1.0):1, specifically it can be 0.3:1, 0.5:1, 0.6:1, 0.8:1, 0.9:1, 1:1 etc., which is not limited here.

The solvent includes at least one of the ethyl alcohol, acetone, dioctyl ether, hexadecane, tetraethylene glycol dimethyl ether, and trioctylamine. In some embodiments, gas creating the protective atmosphere includes at least one of nitrogen, helium, neon, argon, krypton and xenon.

In some specific embodiments, the solid-phase thermal reaction is a roasting treatment, and the roasting can be carried out in a firing furnace, so that the roasting can be fully carried out.

Optionally, the temperature of the solid-phase thermal reaction is 500° C. to 1300° C. More specifically, it can be but not limited to 500° C., 600° C., 700° C., 750° C., 800° C., 850° C., 900° C., 950° C., 1000° C., 1050° C. or 1300° C., etc., other unlisted values within this range are also applicable, and 700° C. to 1050° C. are preferred. Understandably, when the reaction is too high, it will be violent, and the silicon crystal grains will grow up sharply, which will affect the cyclic performance of the material; while when the reaction temperature is too low, the lithium-containing compound in the carbon coating layer cannot be generated.

Optionally, the time of the solid-phase thermal reaction is 0.5 h to 12 h, more specifically, it can be but not limited to 0.5 h, 1 h, 3 h, 4 h, 5 h, 6 h, 7 h, 8 h, 9 h, 10 h or 12 h, etc., and other unlisted values within this range are also applicable. Understandably, full firing can help form a lithium-containing compound on the surface of the silicon oxide material. Preferably, the time of the solid-phase thermal reaction is 3 h to 10 h.

Optionally, the heating rate of the solid-phase thermal reaction is 1° C./min to 5° C./min, specifically, it can be but not limited to 1° C./min, 2° C./min, 3° C./min, 4° C./min, or 5° C./min, etc., and other unlisted values within this range are also applicable.

In the above solid-phase thermal reaction process, the lithium oxide or lithium hydroxide in the pores of the carbon coating layer of the silicon-oxygen material can be used as a lithium source to react with the precursor, so that the generated lithium-containing compound is also dispersed and embedded in the pores of the carbon coating layer, and directly connect the silicon-oxygen material in the core and the surface of the entire particle, constructing a complete lithium-ion channel, which effectively prevents the electrolyte from reacting with the silicon-oxygen material to produce the SEI film, alleviates material expansion and ensures normal transmission of the lithium-ion. In addition, the lithium-containing compounds produced in the present application are relatively stable in water-based and oil-based solvents, which can effectively prevent water from contacting lithium-containing compounds to generate strong alkaline by-products, and can reduce the pH of the material, thereby affecting the PH of the entire anode electrode slurry, improving the process stability of the pre-lithiated material, and thereby improving the initial effect of the anode material.

Optionally, the lithium-containing compound includes at least one of multi-lithium phosphate, multi-lithium silicate, and multi-lithium-containing metal oxide.

Optionally, the multi-lithium phosphate includes $Li_xR_yM_zPO_4$, where R is at least one selected from the group consisting of Mg, V and Cr, and M is at least one selected from the group consisting of Al, Sc, Ti, Cu, Zn, Y, Mo, Nb, La and Zr, $0.3 \leq x \leq 1.2$, $0.5 \leq y \leq 1.0$, $0 \leq z \leq 0.2$.

Optionally, the multi-lithium silicate includes $Li_xR_yM_zSiO_4$, where R is at least one selected from the group consisting of Mg, V and Cr, and M is at least one selected from the group consisting of Al, Sc, Ti, Cu, Zn, Y, Mo, Nb, La and Zr, $0.8 \leq x \leq 2.2$, $0.8 \leq y \leq 1.2$, $0 \leq z \leq 0.2$.

Optionally, the multi-lithium-containing metal oxide includes $Li_xR_yM_zO_2$, where R is at least one selected from the group consisting of Al, V and Cr, and M is at least one selected from the group consisting of Mg, Sc, Ti, Cu, Zn, Y, Mo, Nb, La and Zr. $0.3 \leq x \leq 0.7$, $0.2 \leq y \leq 5$, $0 \leq z \leq 0.2$.

Furthermore, since the lithium-containing compound is filled in the pores of the carbon coating layer, a dense composite coating layer is formed, which can more effectively isolate water solvents and prevent gas production.

In some embodiments, after step S100, the method further includes:

Cooling down and sieving the roasted silicon-oxygen composite anode material to make the average particle size of the silicon-oxygen composite anode material to be 1 μm to 10 μm, specifically it can be 1 μm, 2 μm, 3 μm, 4 μm, 6 μm, 7 μm, 8 μm, 9 μm or 10 μm, etc. It is beneficial to improve the cyclic performance of the anode material by controlling the average particle size of the silicon-oxygen composite anode material within the above-mentioned range. Preferably, the average particle size of the silicon-oxygen composite anode material is 4 μm to 7 μm.

In a specific embodiment, the sieving includes at least one of crushing, ball milling, sieving or airflow classification.

In a third aspect, the present application provides a lithium-ion battery comprising the silicon-oxygen composite anode material described in the first aspect or the silicon-oxygen composite anode material prepared by the method described in the second aspect.

Some further examples will be listed below to further describe the embodiments of the present application. Where, the embodiments of the present application are not limited to the following specific examples. Within the scope of protection, changes can be appropriately made for implementation.

Example 1

(1) The carbon-coated silicon-oxygen material SiO/C was reacted with metal lithium to obtain a pre-lithiated carbon-coated silicon-oxygen material Li—SiO/C, where the lithium content was 10 wt %;

(2) $V_2O_5$ and phosphoric acid were mixed in a molar ratio of 1:3 to obtain a precursor, and the average particle size of the precursor was 50 nm;

(3) 5 g precursor and 100 g Li—SiO/C were taken and evenly dispersed in acetone, the obtained mixture was dispersed for 1 hour at high-speed with a high-speed agitator before filtrating, and then under the protection of Ar gas, roasted at 900° C. for 6 hours by controlling the heating efficiency to 2° C./min, naturally cooled down, dispersed and sieved to obtain the silicon-oxygen composite anode material.

The silicon-oxygen composite anode material prepared in this example has an average particle size ($D_{50}$) of 5.13 μm, a tap density of 0.98 g/cm³, a specific surface area of 2.19 m²/g, and a porosity of 1.98%. The content of carbon is 5.0 wt %. The composite coating layer of the silicon-oxygen composite anode material is 100 nm, where the lithium-containing compound is mainly $Li_3V_2(PO_4)_3$, and the lithium-containing compound is filled in the pores of the carbon layer.

Example 2

(1) The carbon-coated silicon-oxygen material SiO/C was reacted with metal lithium to obtain a pre-lithiated carbon-coated silicon-oxygen material Li—SiO/C, where the lithium content was 10 wt %;

(2) MgO and $SiO_2$ were mixed in a molar ratio of 1:1 to obtain a precursor, and the average particle size of the precursor was 50 nm;

(3) 5 g precursor and 100 g Li—SiO/C were taken and evenly dispersed in acetone, the obtained mixture was dispersed for 1 hour at high-speed dispersion with a high-speed agitator before filtrating, and then under the protection of Ar gas, roasted at 700° C. for 6 hours by controlling the heating efficiency to 2° C./min, naturally cooled down, dispersed and sieved to obtain the silicon-oxygen composite anode material.

The silicon-oxygen composite anode material prepared in this example has an average particle size ($D_{50}$) of 5.12 μm, a tap density of 0.98 g/cm³, a specific surface area of 2.17 m²/g, and a porosity of 1.99%. The content of carbon is 5.0 wt %. The composite coating layer of the silicon-oxygen composite anode material is 100 nm, where the lithium-containing compound includes $Li_2MgSiO_4$, and the lithium-containing compound is filled in the pores of the carbon layer.

Example 3

(1) The carbon-coated silicon-oxygen material SiO/C was reacted with metal lithium to obtain a pre-lithiated carbon-coated silicon-oxygen material Li—SiO/C, where the lithium content was 10 wt %;

(2) $V_2O_5$, $Cr_2O_3$ and phosphoric acid were mixed in a molar ratio of 1:1:6 to obtain a precursor, and the average particle size of the precursor was 50 nm;

(3) 5 g precursor and 100 g Li—SiO/C were taken and evenly dispersed in acetone, the obtained mixture was dispersed 1 hour at high-speed with a high-speed agitator before filtrating, and then under the protection of Ar gas, roasted at 1000° C. for 5 hours by controlling the heating efficiency to 2° C./min, naturally cooled down, dispersed and sieved to obtain the silicon-oxygen composite anode material.

The silicon-oxygen composite anode material prepared in this example has an average particle size ($D_{50}$) of 5.13 μm, a tap density of 0.98 g/cm³, a specific surface area of 2.13 m²/g, and a porosity of 1.99%. The content of carbon is 5.0 wt %. The composite coating layer of the silicon-oxygen composite anode material is 100 nm, where the lithium-containing compound includes $Li_3VCr(PO_4)_3$, $Li_3V_2(PO_4)_3$ and $Li_3Cr_2(PO_4)_3$, and the lithium-containing compound is filled in the pores of the carbon layer.

Example 4

(1) the carbon-coated silicon-oxygen material SiO/C was reacted with metal lithium to obtain the pre-lithiated carbon-coated silicon-oxygen material Li—SiO/C, where the lithium content was 10 wt %;

(2) 5 g $V_2O_3$ with an average particle size of 50 nm and 100 g Li—SiO/C were taken and evenly disperse in acetone, the obtained mixture was dispersed for 1 hour at high-speed with a high-speed agitator before filtrating, and then under the protection of Ar gas, roasted at 800° C. for 8 hours by controlling the heating efficiency to 3° C./min, naturally cooled down, dispersed and sieved to obtain the silicon-oxygen composite anode material.

The silicon-oxygen composite anode material prepared in this example has an average particle size ($D_{50}$) of 5.14 μm, a tap density of 0.98 g/cm³, a specific surface area of 2.2

$m^2/g$, and a porosity of 1.98%. The content of carbon is 5.0 wt %. The composite coating layer of the silicon-oxygen composite anode material is 100 nm, where the lithium-containing compound includes $LiVO_2$, and the lithium-containing compound is filled in the pores of the carbon layer.

Example 5

(1) The carbon-coated silicon-oxygen material SiO/C was reacted with metal lithium to obtain the pre-lithiated carbon-coated silicon-oxygen material Li—SiO/C, where the lithium content was 10 wt %;

(2) 5 g $Cr_2O_3$ with an average particle size of 50 nm and 100 g Li—SiO/C were taken, and evenly dispersed in acetone, the obtained mixture was dispersed for 1 hour at high-speed dispersion with a high-speed agitator before filtrating, and then under the protection of Ar gas, roasted at 500° C. for 10 hours by controlling the heating efficiency to 1° C./min, naturally cooled down, and dispersed and sieved to obtain the silicon-oxygen composite anode material.

The silicon-oxygen composite anode material prepared in this example has an average particle size ($D_{50}$) of 5.20 μm, a tap density of 0.98 $g/cm^3$, a specific surface area of 2.15 $m^2/g$, and a porosity of 2.02%. The content of carbon is 5.0 wt %. The composite coating layer of the silicon-oxygen composite anode material is 100 nm, where the lithium-containing compound includes $Li_2CrO_4$, and the lithium-containing compound is filled in the pores of the carbon layer.

Example 6

(1) The carbon-coated silicon-oxygen material SiO/C was reacted with metal lithium to obtain a pre-lithiated carbon-coated silicon-oxygen material Li—SiO/C, where the lithium content was 10 wt %;

(2) $Ti(OH)_4$ and phosphoric acid were mixed in a molar ratio of 2:3 to obtain a precursor, and the average particle size of the precursor was 50 nm;

(3) 5 g precursor and 100 g Li—SiO/C were taken and evenly dispersed in acetone, the obtained mixture was dispersed for 1 hour at high-speed with a high-speed agitator before filtrating, and then under the protection of Ar gas, roasted at 1050° C. for 6 hours by controlling the heating efficiency to 5° C./min, naturally cooled down, dispersed and sieved to obtain the silicon-oxygen composite anode material.

The silicon-oxygen composite anode material prepared in this example has an average particle size ($D_{50}$) of 5.20 μm, a tap density of 0.98 $g/cm^3$, a specific surface area of 2.23 $m^2/g$, and a porosity of 2.07%. The content of carbon is 5.0 wt %. The composite coating layer of the silicon-oxygen composite anode material is 100 nm, where the lithium-containing compound includes $LiTi_2(PO_4)_3$, and the lithium-containing compound is filled in the pores of the carbon layer.

Example 7

(1) The carbon-coated silicon-oxygen material SiO/C was reacted with metal lithium to obtain a pre-lithiated carbon-coated silicon-oxygen material Li—SiO/C, where the lithium content was 10 wt %;

(2) $V_2O_5$ and phosphoric acid were mixed in a molar ratio of 1:3 to obtain a precursor, and the average particle size of the precursor was 50 nm;

(3) 10 g precursor and 100 g Li—SiO/C were taken and evenly dispersed in acetone, the obtained mixture was dispersed for 1 hour at high-speed with a high-speed agitator, and then under the protection of Ar gas, roasted at 900° C. for 6 hours by controlling the heating efficiency to 2° C./min, naturally cooled down, dispersed and sieved to obtain the silicon-oxygen composite anode material.

The silicon-oxygen composite anode material prepared in this example has an average particle size ($D_{50}$) of 5.17 μm, a tap density of 0.98 $g/cm^3$, a specific surface area of 2.15 $m^2/g$, and a porosity of 1.98%. The content of carbon is 5.0 wt %. The composite coating layer of the silicon-oxygen composite anode material is 100 nm, where the lithium-containing compound includes $Li_3V_2(PO_4)_3$ and some lithium vanadium phosphate with low lithium content such as $Li_{2.5}V_2(PO_4)_3$, and the lithium-containing compound is filled in the pores of the carbon layer.

Example 8

(1) The carbon-coated silicon-oxygen material SiO/C was reacted with metal lithium to obtain a pre-lithiated carbon-coated silicon-oxygen material Li—SiO/C, where the lithium content was 10 wt %;

(2) $V_2O_5$ and phosphoric acid were mixed in a molar ratio of 1:3 to obtain a precursor, and the average particle size of the precursor was 50 nm;

(3) 1.5 g precursor and 100 g Li—SiO/C were taken and evenly dispersed in ethyl alcohol, the obtained mixture was dispersed for 1 hour at high-speed with a high-speed agitator before filtrating, and then under the protection of Ar gas, roasted at 900° C. for 6 hours by controlling the heating efficiency to 2° C./min, naturally cooled down, dispersed and sieved to obtain the silicon-oxygen composite anode material.

The silicon-oxygen composite anode material prepared in this example has an average particle size ($D_{50}$) of 5.15 μm, a tap density of 0.98 $g/cm^3$, a specific surface area of 3.13 $m^2/g$, and a porosity of 2.03%. The content of carbon is 5.0 wt %. The composite coating layer of the silicon-oxygen composite anode material is 100 nm, where the lithium-containing compound is $Li_3V_2(PO_4)_3$, and the lithium-containing compound is filled in the pores of the carbon layer.

Example 9

(1) The carbon-coated silicon-oxygen material SiO/C was reacted with metal lithium to obtain a pre-lithiated carbon-coated silicon-oxygen material Li—SiO/C, where the lithium content was 3 wt %;

(2) $V_2O_3$ and phosphoric acid were mixed in a molar ratio of 1:3 to obtain a precursor, and the average particle size of the precursor was 50 nm;

(3) 5 g precursor and 100 g Li—SiO/C were taken and evenly dispersed in ethyl alcohol, the obtained mixture was dispersed for 1 hour at high-speed with a high-speed agitator before filtrating, and then under the protection of Ar gas, roasted at 900° C. for 6 hours by controlling the heating efficiency to 2° C./min, naturally cooled down, dispersed and sieved to obtain the silicon-oxygen composite anode material.

The silicon-oxygen composite anode material prepared in this example has an average particle size ($D_{50}$) of 5.19 μm, a tap density of 0.98 $g/cm^3$, a specific surface area of 2.67 $m^2/g$, and a porosity of 1.93%. The content of carbon is 5.0 wt %. The composite coating layer of the silicon-oxygen composite anode material is 100 nm, where the lithium-containing compound is $Li_{2.5}V_2(PO_4)_3$ and a few $Li_3V_2$ $(PO_4)_3$, and the lithium-containing compound is filled in the pores of the carbon layer.

Example 10

(1) The carbon-coated silicon-oxygen material SiO/C was reacted with metal lithium to obtain a pre-lithiated carbon-coated silicon-oxygen material Li—SiO/C, where the lithium content was 10 wt %;

(2) $V_2O_3$ and phosphoric acid were mixed in a molar ratio of 1:3 to obtain a precursor, and the average particle size of the precursor was 50 nm;

(3) 5 g precursor and 100 g Li—SiO/C were taken and evenly dispersed in tetraethylene glycol dimethyl ether, the obtained mixture was dispersed for 1 hour at high-speed with a high-speed agitator before filtrating, and then under the protection of Ar gas, roasted at 450° C. for 6 hours by controlling the heating efficiency to 2° C./min, naturally cooled down, dispersed and sieved to obtain the silicon-oxygen composite anode material.

The silicon-oxygen composite anode material prepared in this example has an average particle size ($D_{50}$) of 5.20 μm, a tap density of 0.98 g/cm³, a specific surface area of 3.27 m²/g, and a porosity of 2.02%. The content of carbon is 5.0 wt %. The composite coating layer of the silicon-oxygen composite anode material is 100 nm.

Example 11

(1) The carbon-coated silicon-oxygen material $SiO_{1.5}/C$ was reacted with metal lithium (10 wt %) to obtain a pre-lithiated carbon-coated silicon-oxygen material Li—SiO/C, where the lithium content was 10 wt %;

(2) $V_2O_3$ and phosphoric acid were mixed in a molar ratio of 1:3 to obtain a precursor, and the average particle size of the precursor was 50 nm;

(3) 5 g precursor and 100 g Li—SiO/C were taken and evenly dispersed in acetone, the obtained mixture was dispersed for 1 hour at high-speed with a high-speed agitator before filtrating, and then under the protection of Ar gas, roasted at 900° C. for 6 hours by controlling the heating efficiency to 2° C./min, naturally cooled down, dispersed and sieved to obtain the silicon-oxygen composite anode material.

The silicon-oxygen composite anode material prepared in this example has an average particle size ($D_{50}$) of 5.13 μm, a tap density of 0.98 g/cm³, a specific surface area of 2.15 m²/g, and a porosity of 1.99%. The content of carbon is 5.0 wt %. The composite coating layer of the silicon-oxygen composite anode material is 100 nm, where the lithium-containing compound includes $Li_3V_2(PO_4)_3$, and the lithium-containing compound is filled in the pores of the carbon layer.

Example 12

(1) The carbon-coated silicon-oxygen material $SiO_{1.5}/C$ was reacted with metal lithium (20 wt %) to obtain a pre-lithiated carbon-coated silicon-oxygen material Li—SiO/C, where the lithium content was 20 wt %;

(2) $V_2O_3$ and phosphoric acid were mixed in a molar ratio of 1:3 to obtain a precursor, and the average particle size of the precursor was 50 nm;

(3) 5 g precursor and 100 g Li—SiO/C were taken and evenly dispersed in acetone, the obtained mixture was dispersed for 1 hour at high-speed with a high-speed agitator before filtrating, and then under the protection of Ar gas, roasted at 900° C. for 6 hours by controlling the heating efficiency to 2° C./min, naturally cooled down, dispersed and sieved to obtain the silicon-oxygen composite anode material.

The silicon-oxygen composite anode material prepared in this example has an average particle size ($D_{50}$) of 5.43 μm, a tap density of 0.98 g/cm³, a specific surface area of 2.13 m²/g, and a porosity of 1.98%. The content of carbon is 5.0 wt %. The composite coating layer of the silicon-oxygen composite anode material is 100 nm, where the lithium-containing compound includes $Li_3V_2(PO_4)_3$, and the lithium-containing compound is filled in the pores of the carbon layer.

Example 13

Different from Example 7, the average particle size of the precursor is 400 nm.

The silicon-oxygen composite anode material prepared in this example has an average particle size ($D_{50}$) of 5.13 μm, a tap density of 0.98 g/cm³, a specific surface area of 2.17 m²/g, and a porosity of 2.01%. The content of carbon is 5.0 wt %. The composite coating layer of the silicon-oxygen composite anode material is 100 nm, where the lithium-containing compound includes $Li_3V_2(PO_4)_3$, and the lithium-containing compound is filled in the pores of the carbon layer.

Example 14

(1) The carbon-coated silicon-oxygen material SiO/C was reacted with metal lithium to obtain a pre-lithiated carbon-coated silicon-oxygen material Li—SiO/C, where the lithium content was 10 wt %;

(2) $V_2O_5$, $Ti(OH)_4$ and phosphoric acid were mixed in a molar ratio of 0.5:3:6 to obtain a precursor, and the average particle size of the precursor was 50 nm;

(3) 5 g precursor and 100 g Li—SiO/C were taken and evenly dispersed in acetone, the obtained mixture was dispersed for 1 hour at high-speed with a high-speed agitator before filtrating, and then under the protection of Ar gas, roasted at 1000° C. for 5 hours by controlling the heating efficiency to 2° C./min, naturally cooled down, dispersed and sieved to obtain the silicon-oxygen composite anode material.

The silicon-oxygen composite anode material prepared in this example has an average particle size ($D_{50}$) of 5.13 μm, a tap density of 0.98 g/cm³, a specific surface area of 2.13 m²/g, and a porosity of 1.99%. The content of carbon is 5.0 wt %. The composite coating layer of the silicon-oxygen composite anode material is 100 nm, where the lithium-containing compound includes $Li_6Ti_3V(PO_4)_6$, $Li_3V_2(PO_4)_3$ and $LiTi_2(PO_4)_3$, and the lithium-containing compound is filled in the pores of the carbon layer.

Example 15

(1) The carbon-coated silicon-oxygen material SiO/C was reacted with metal lithium to obtain a pre-lithiated carbon-coated silicon-oxygen material Li—SiO/C, where the lithium content was 10 wt %;

(2) $La_2O_3$, $Al_2O_3$ and $SiO_2$ were mixed in a molar ratio of 0.1:0.9:2 to obtain a precursor, and the average particle size of the precursor was 50 nm;

(3) 5 g precursor and 100 g Li—SiO/C were taken and evenly dispersed in acetone, the obtained mixture was dispersed for 1 hour at high-speed with a high-speed agitator before filtrating, and then under the protection of Ar gas, roasted at 1000° C. for 5 hours by controlling the heating efficiency to 2° C./min, naturally cooled down, dispersed and sieved to obtain the silicon-oxygen composite anode material.

The silicon-oxygen composite anode material prepared in this example has an average particle size ($D_{50}$) of 5.13 μm, a tap density of 0.98 g/cm$^3$, a specific surface area of 2.13 m$^2$/g, and a porosity of 1.99%. The content of carbon is 5.0 wt %. The composite coating layer of the silicon-oxygen composite anode material is 100 nm, where the lithium-containing compound includes La doped with LiAlSiO$_4$, and the lithium-containing compound is filled in the pores of the carbon layer.

Example 16

(1) The carbon-coated silicon-oxygen material SiO/C was reacted with metal lithium to obtain a pre-lithiated carbon-coated silicon-oxygen material Li—SiO/C, where the lithium content was 10 wt %;

(2) La$_2$O$_3$ and Al(OH)$_3$ were mixed in a molar ratio of 0.05:0.9 by ball milling to obtain a precursor, and the average particle size of the precursor was 50 nm;

(3) 5 g precursor and 100 g Li—SiO/C were taken and evenly dispersed in acetone, the obtained mixture was dispersed for 1 hour at high-speed dispersion with a high-speed agitator before filtrating, and then under the protection of Ar gas, roasted at 1000° C. for 5 hours by controlling the heating efficiency to 2° C./min, naturally cooled down, dispersed and sieved it to obtain the silicon-oxygen composite anode material.

The silicon-oxygen composite anode material prepared in this example has an average particle size ($D_{50}$) of 5.13 μm, a tap density of 0.98 g/cm$^3$, a specific surface area of 2.13 m$^2$/g, and a porosity of 1.99%. The content of carbon is 5.0 wt %. The composite coating layer of the silicon-oxygen composite anode material is 100 nm, where the lithium-containing compound includes La doped with LiAlO$_2$, and the lithium-containing compound is filled in the pores of the carbon layer.

Comparative Example 1

The carbon-coated silicon-oxygen material SiO/C was used as the silicon-oxygen composite anode material, the average particle size ($D_{50}$) of it was 5.12 μm, the tap density was 0.98 g/cm$^3$, the specific surface area was 2.59 m$^2$/g, the porosity was 2.20%, and the content of carbon was 5.0 wt %.

Comparative Example 2

The pre-lithiated carbon-coated silicon-oxygen material Li—SiO/C was used as the silicon-oxygen composite anode material, the average particle size ($D_{50}$) of it was 5.14 μm, the tap density was 0.98 g/cm$^3$, the specific surface area was 3.24 m$^2$/g, the porosity was 2.17%, and the content of carbon was 5.0 wt %.

Comparative Example 3

(1) The carbon-coated silicon-oxygen material SiO/C was reacted with metal lithium to obtain the pre-lithiated carbon-coated silicon-oxygen material Li—SiO/C;

(2) 5 g LATP(Li$_{1.4}$Al$_{0.4}$Ti$_{1.6}$(PO$_4$)$_3$, commercial available) and 100 g Li—SiO/C were dispersed at high-speed, and then roasted at 900° C. for 6 hours under the protection of Ar gas by controlling the heating efficiency to 2° C./min, naturally cooled down, dispersed and sieved to obtain the silicon-oxygen composite anode material.

The silicon-oxygen composite anode material prepared in this example has an average particle size ($D_{50}$) of 5.17 μm, a tap density of 0.98 g/cm$^3$, a specific surface area of 3.4 m$^2$/g, and a porosity of 2.17%. The content of carbon is 5.0 wt %. Since multi-lithium phosphate is directly used, which doesn't react with the residual alkali on the surface of the silicon base, and thereby cannot enter inside of the carbon layer and the material, so the multi-lithium phosphate stores on the surface layer of the material.

Testing Method

1. Electric Performance Test

The silicon-oxygen composite anode materials obtained in Examples 1 to 13 (S1 to S13) and Comparative Examples 1 to 3 (R1 to R3) were used as the anode active material, the active material, CMC and SBR with the mass ratio of 96.5:1.5:2 was mixed uniformly, and then coated on the copper foil current collector, and dried to obtain a anode pole piece for later use.

Firstly, the button cell test on the obtained pole piece was performed, the battery was assembled in an argon glove box, the metal lithium piece was used as the anode pole. The electrolyte was 1 mol/LLiPF6+EC+EMC, the diaphragm was a polyethylene/propylene composite microporous membrane, and the electrochemical performance was carried out on a battery testing instrument. The battery capacity was set to a standard 480 mAh/g, the charge and discharge voltage was 0.01 to 1.5V, and the charge and discharge rate was 0.1 C. The charge and discharge test was conducted to obtain the initial reversible capacity and the first round of charge and discharge capacity. The initial coulombic efficiency equaled to the ratio of the first round of discharge capacity and charge capacity.

Repeat the cycle for 50 rounds, then the thickness of the pole piece of the lithium-ion battery at this moment was measured using a micrometer as H1, the expansion rate of the pole piece after 50 rounds of cycles equaled to (H1−H0)/H0×100%.

Repeat the cycle for 50 rounds, the discharge capacity was recorded as the rest capacity of the lithium-ion battery; the capacity retention ratio equaled to the rest capacity/the initial capacity×100%.

2. Method to Test the Average Particle Size of the Anode Material

The particle size test for the anode material was determined by using the Malvin Mastersizer 2000 Laser particle size tester to obtain the average particle size.

3. Method to Test the Specific Surface Area of the Anode Material

The specific surface area test for the anode material was conducted by using Mike Tristar3020 Specific surface area and aperture analyzer. Specifically, certain mass of powders was weighed and taken, deaerated completely under vacuum heating, and then the method of nitrogen adsorption was used to figure out the specific surface area of the particle based on the amount of adsorbed nitrogen after removing the adsorbate on the surface.

4. Test for the Porosity of the Anode Material

The porosity test for the anode material was conducted by using the method of gas replacement. The calculation method was the percentage of the pore volume of the sample to the total volume, P=(V0−V)/V0*100%, where V$_0$ meant the volume in natural status, which was also called apparent volume, with the unit of $cm^3$ or $m^3$. V meant the absolute compact volume with the unit of $cm^3$ or $m^3$.

4. Test for the Tap Density of the Anode Material

The national standard GB/T 5162-2006, 'Determination of tap density for Metallic powders' was used.

5. Test for the Content of Carbon of the Anode Material

A high frequency furnace was used to heat and burn the anode material sample in high temperature under the oxygen-enriched condition, the carbon was oxidized into carbon dioxide, and then the processed carbon dioxide would enter into the corresponding absorption cell, adsorb corresponding infrared radiation and then be transformed into corresponding signal by the detector. The signal would be sampled by a computer, and then be transformed into a value that is in direct proportion to the concentration of the carbon dioxide after the linearity correction. Values in the entire analysis process were accumulated, and after the analysis, the accumulated value was divided by the weight value in the computer, followed by multiplying the correction coefficient and deducting the blank, then the content of carbon in the sample will be obtained. The sample test was conducted with the high frequency infrared carbon and sulfur analyzer, and the type of the analyzer was Shanghai DeKai HCS-140.

6. Test for the PH

The PH means the PH of the slurry.

7. Test for the Gas Production 4 ml was taken into the sealed syringe (small syringe with 10 ml measuring range) after the slurry adjustment was completed, and then the volume change value of the slurry gas in the syringe was observed after 8 hours.

TABLE 2-continued

| Sample | Initial Coulombic Efficiency (%) | Initial Reversible Capacity (mAh/g) | Capacity Retention Ratio after 50-cycles (%) | Expansion Rate of the Pole Piece (%) |
|---|---|---|---|---|
| S4 | 88.51 | 1360.8 | 89.0 | 31.7 |
| S5 | 88.50 | 1361.2 | 89.1 | 31.6 |
| S6 | 88.20 | 1344.1 | 87.4 | 32.9 |
| S7 | 88.43 | 1345.7 | 89.5 | 30.5 |
| S8 | 88.19 | 1340.8 | 84.7 | 38.3 |
| S9 | 81.37 | 1503.2 | 85.5 | 35.2 |
| S10 | 88.15 | 1346.3 | 85.1 | 38.3 |
| S11 | 83.21 | 853.7 | 90.1 | 28.3 |
| S12 | 87.33 | 1137.2 | 83.9 | 37.2 |
| S13 | 88.21 | 1343.9 | 85.8 | 37.0 |
| S14 | 88.53 | 1351.9 | 89.3 | 32.1 |
| S15 | 88.29 | 1377.2 | 90.3 | 33.9 |
| S16 | 88.77 | 1402.7 | 88.9 | 30.5 |
| R1 | 77.10 | 1602.3 | 85.6 | 36.7 |
| R2 | 88.17 | 1362.1 | 85.2 | 37.3 |
| R3 | 88.15 | 1342.7 | 84.9 | 37.7 |

Combining the Table 1 and Table 2, it can be seen that the silicon-oxygen composite anode materials provided in Examples 1 to 8 synthesize a lithium-containing compound that is stable in an aqueous oil-based solvent, so that the lithium-containing compound and the carbon material are constructed to form a composite coating layer, where the lithium compound is embedded in the pores of the carbon material, which effectively prevents water from contacting the lithium source to produce alkalinity and lowering the pH of the solvent; This can maintain high initial effect and

TABLE 1

Test result statistics table

| Sample | Average Particle Size $D_{50}$ (μm) | Tap Density (g/cm³) | Specific Surface Area (m²/g) | Porosity (%) | Content of Carbon (wt %) | Amount of the added Precursor (wt %) | PH | Process Performance Gas Production (ml) |
|---|---|---|---|---|---|---|---|---|
| S1 | 5.13 | 0.98 | 2.19 | 1.98 | 5.0 | 5.0 | 11.1 | 0.5 |
| S2 | 5.12 | 0.98 | 2.17 | 1.99 | 5.0 | 5.0 | 11.0 | 0.0 |
| S3 | 5.13 | 0.98 | 2.13 | 1.99 | 5.0 | 5.0 | 11.0 | 0.6 |
| S4 | 5.14 | 0.98 | 2.20 | 1.98 | 5.0 | 5.0 | 11.1 | 0.0 |
| S5 | 5.20 | 0.98 | 2.15 | 2.02 | 5.0 | 5.0 | 11.1 | 0.0 |
| S6 | 5.20 | 0.98 | 2.23 | 2.07 | 5.0 | 5.0 | 11.1 | 2.3 |
| S7 | 5.17 | 0.98 | 2.15 | 1.98 | 5.0 | 10.0 | 11.0 | 0.0 |
| S8 | 5.15 | 0.98 | 3.13 | 2.03 | 5.0 | 1.5 | 11.6 | 6+ |
| S9 | 5.19 | 0.98 | 2.67 | 1.93 | 5.0 | 5.0 | 9.9 | 0.0 |
| S10 | 5.20 | 0.98 | 3.27 | 2.02 | 5.0 | 5.0 | 11.7 | 6+ |
| S11 | 5.31 | 0.98 | 2.15 | 1.99 | 5.0 | 5.0 | 10.3 | 0.0 |
| S12 | 5.43 | 0.98 | 2.13 | 1.98 | 5.0 | 5.0 | 11.5 | 6+ |
| S13 | 5.41 | 0.98 | 2.17 | 2.01 | 5.0 | 1.5 | 11.5 | 4.9 |
| S14 | 5.01 | 0.98 | 2.10 | 1.93 | 5.0 | 5.0 | 10.3 | 0.0 |
| S15 | 5.09 | 0.98 | 2.09 | 1.91 | 5.0 | 5.0 | 10.9 | 0.0 |
| S16 | 5.12 | 0.98 | 2.11 | 1.97 | 5.0 | 5.0 | 10.8 | 0.0 |
| R1 | 5.12 | 0.98 | 2.59 | 2.20 | 5.0 | 0.0 | 8.2 | 0.0 |
| R2 | 5.14 | 0.98 | 3.24 | 2.17 | 5.0 | 0.0 | 11.6 | 6+ |
| R3 | 5.17 | 0.98 | 3.40 | 2.17 | 5.0 | 5.0 | 11.6 | 6+ |

TABLE 2

| Sample | Initial Coulombic Efficiency (%) | Initial Reversible Capacity (mAh/g) | Capacity Retention Ratio after 50-cycles (%) | Expansion Rate of the Pole Piece (%) |
|---|---|---|---|---|
| S1 | 88.27 | 1349.9 | 88.0 | 32.1 |
| S2 | 88.33 | 1355.3 | 89.8 | 30.8 |
| S3 | 88.29 | 1349.4 | 88.3 | 32.0 | meanwhile stabilize Li and weaken the influence of the lithium source on the solvent, thereby improve the stability of the slurry during processing.

The difference between Example 8 and Example 1 is that, 1.5 g of precursor is mixed with 100Li—SiO/C in Example 8, since the content of the precursor is too low, the precursor cannot be fully filled in the pores of the carbon coating layer, which is disadvantageous for the precursor to pass through the pores of the carbon coating layer to react with the lithium oxide or lithium hydroxide in the pores, meanwhile it causes the residual lithium oxide or lithium hydroxide in the carbon coating layer to contact with water and generate strong alkaline by-products, increasing the alkalinity of the material, and causing serious gas production during the charging and discharging process of the battery, thereby the initial effect and cycle stability of the battery will decrease.

The difference between Example 9 and Example 1 is that, the lithium content of the carbon-coated silicon-oxygen material after pre-lithiation is 1 wt %, which is too low, it is disadvantageous for the full reaction of the lithium oxide or lithium hydroxide embedded in the silicon oxide material with the precursor. The precursor reacts with water, making the acidity of the material increases, which will reduce the initial effect of the battery, and increase the expansion rate of the pole piece.

The difference between Example 10 and Example 1 is that the roasting temperature in Example 10 is too low, resulting in the failure of the formation of lithium-containing compounds in the carbon coating layer. So the initial reversible capacity, initial effect, cycle retention rate and other performances of the battery made of the anode material are all inferior to that of Example 1. It can be seen that it is more appropriate to control the roasting temperature in the range of 500° C. to 1050° C. Preferably, the roasting temperature is controlled at 700° C. to 1050° C., which can guarantee the processing performance and electrochemical performance of the product.

It doesn't perform pre-lithiation treatment on the silicon-oxygen anode material in Comparative Example 1, so the initial reversible capacity, initial coulombic efficiency and retention rate after 50-cycles are all lower than the product in Example 1.

Although the silicon-oxygen anode material provided in Comparative Example 2 has been treated with pre-lithiation, the lithium source is not subjected to post-treatment. During the charging and discharging process of the battery, the lithium source reacts with the solvent to produce alkalinity, the pH of the solvent increases, and the gas production of the slurry is severe, which affects the initial effect and cycle stability of the battery.

The silicon-oxygen anode material provided in Comparative Example 3 directly uses multi-lithium phosphate (LATP) and a lithium source, which doesn't react with the residual alkali on the surface of silicon base, and thereby fails to enter inside of the carbon layer and the material, therefore the multi-lithium phosphate stores on the surface layer of the material.

The applicant declares that the examples described in the specification are intended to explain the present application, and the specific substances, formula ratios and reaction conditions mentioned in the present application are nothing but specific manifestations of the above-mentioned substances, formula ratios and reaction conditions, which never means further limitation to the present application, namely, it never means that the present application has to reply on the above detailed methods for implementation. Those skilled in the art should understand that all technologies implemented based on the above content of the present application belong to the scope of the application. Any improvement to the present application, equivalent replacement of each raw material of the product of this application, addition of auxiliary components, and the selection of specific methods etc., all fall within the scope of protection and disclosure of the present application.

The invention claimed is:

1. A silicon-oxygen composite anode material, wherein the silicon-oxygen composite anode material comprises a silicon-oxygen material and a composite coating layer coating the surface of the silicon-oxygen material, and the composite coating layer comprises a carbon material and a lithium-containing compound, the carbon material has pores, and the lithium-containing compound is filled in the pores, wherein the lithium-containing compound comprises at least one of multi-lithium phosphate, multi-lithium silicate, and multi-lithium-containing metal oxide, wherein the multi-lithium phosphate comprises $Li_xR_yM_2PO_4$, wherein R is at least one selected from the group consisting of Mg, V and Cr, and M is at least one selected from the group consisting of Al, Sc, Ti, Cu, Zn, Y, Mo, Nb, La and Zr, $0.3 \leq x \leq 1.2$, $0.5 \leq y \leq 1.0$, $0 \leq z \leq 0.2$; the multi-lithium silicate comprises $Li_xR_yM_2SiO_4$, wherein R is at least one selected from the group consisting of Mg, V and Cr, and M is at least one selected from the group consisting of Al, Sc, Ti, Cu, Zn, Y, Mo, Nb, La and Zr, $0.8 \leq x \leq 2.2$, $0.8 \leq y \leq 1.2$, $0 \leq z \leq 0.2$; and the multi-lithium-containing metal oxide comprises $Li_xR_yM_2O_2$, wherein R is at least one selected from the group consisting of Al, V and Cr, and M is at least one selected from the group consisting of Mg, Sc, Ti, Cu, Zn, Y, Mo, Nb, La and Zr, $0.3 \leq x \leq 0.7$, $0.2 \leq y \leq 5$, $0 \leq z \leq 0.2$.

2. The silicon-oxygen composite anode material according to claim 1, wherein the silicon-oxygen composite anode material satisfies at least one of the following conditions a to f:

a. the chemical formula of the silicon-oxygen material is SiOn, wherein $0.5 \leq n \leq 1.5$;

b. the average particle size of the silicon-oxygen material is 3.5 µm to 8.0 µm;

c. the thickness of the composite coating layer is 1 nm to 150 nm;

d. based on 100% of the mass of silicon-oxygen composite anode material, the mass amount of the lithium-containing compound accounts for 0.1% to 10.0%;

e. the morphology of the lithium-containing compound comprises at least one of granular, flocculent and fibrous; and f. the average particle size of the lithium-containing compound is 1 nm to 80 nm.

3. The silicon-oxygen composite anode material according to claim 1, wherein the silicon-oxygen composite anode material satisfies at least one of the following conditions a to g:

a. the tap density of the silicon-oxygen composite anode material is 0.7 g/cm³ to 1.2 g/cm³;

b. the specific surface area of the silicon-oxygen composite anode material is 1.50 m²/g to 5.00 m²/g;

c. the porosity of the silicon-oxygen composite anode material is 0.5% to 15.0%;

d. the porosity of the composite coating layer is 0.5% to 15%;

e. the average particle size of the silicon-oxygen composite anode material is 1.0 µm to 12.0 µm;

f. the mass percentage content of carbon in the silicon-oxygen composite anode material is 3.0% to 6.0%;

g. the pH of the silicon-oxygen composite anode material is 10.0 to 12.0.

4. A silicon-oxygen composite anode material, wherein the silicon-oxygen composite anode material comprises a silicon-oxygen material and a composite coating layer coating the surface of the silicon-oxygen material, and the composite coating layer comprises a carbon material and a lithium-containing compound, the lithium-containing compound is distributed inside of the carbon material, wherein the lithium-containing compound comprises at least one of multi-lithium phosphate, multi-lithium silicate, and multi-lithium-containing metal oxide, wherein the multi-lithium phosphate comprises $Li_xR_yM_2PO_4$, wherein R is at least one selected from the group consisting of Mg, V and Cr, and M is at least one selected from the group consisting of Al, Sc, Ti, Cu, Zn, Y, Mo, Nb, La and Zr, $0.3 \leq x \leq 1.2$, $0.5 \leq y \leq 1.0$, $0 \leq z \leq 0.2$; the multi-lithium silicate comprises $Li_xR_yM_2SiO_4$, wherein R is at least one selected from the group consisting of Mg, V and Cr, and M is at least one selected from the group consisting of Al, Sc, Ti, Cu, Zn, Y, Mo, Nb, La and Zr, $0.8 \leq x \leq 2.2$, $0.8 \leq y \leq 1.2$, $0 \leq z \leq 0.2$; and the multi-lithium-containing metal oxide comprises $Li_xR_yM_2O_2$, wherein R is at least one selected from the group consisting of Al, V and Cr, and M is at least one selected from the group consisting of Mo, Sc, Ti, Cu, Zn, Y, Mo, Nb, La and Zr, $0.3 \leq x \leq 0.7$, $0.2 \leq y \leq 5$, $0 \leq z \leq 0.2$.

5. The silicon-oxygen composite anode material according to claim 2, wherein the silicon-oxygen composite anode material satisfies at least one of the following conditions l to q:

l. The chemical formula of the silicon-oxygen material is $SiO_n$, wherein $0.5 \leq n \leq 1.5$;

m. the average particle size of the silicon-oxygen material is 3.5 μm to 8.0 μm;

n. the thickness of the composite coating layer is 1 nm to 150 nm;

o. based on 100% of the mass of silicon-oxygen composite anode material, the mass amount of the lithium-containing compound accounts for 0.1% to 10.0%;

p. the morphology of the lithium-containing compound comprises at least one of granular, flocculent and fibrous; and q. the average particle size of the lithium-containing compound is 1 nm to 80 nm.

6. The silicon-oxygen composite anode material according to claim 4, wherein the silicon-oxygen composite anode material satisfies at least one of the following conditions h to n:

h. the tap density of the silicon-oxygen composite anode material is 0.7 $g/cm^3$ to 1.2 $g/cm^3$;

i. the specific surface area of the silicon-oxygen composite anode material is 1.50 $m^2/g$ to 5.00 $m^2/g$;

j. the porosity of the silicon-oxygen composite anode material is 0.5% to 15.0%;

k. the porosity of the composite coating layer is 0.5% to 15%;

l. the average particle size of the silicon-oxygen composite anode material is 1.0 μm to 12.0 μm;

m. the mass percentage content of carbon in the silicon-oxygen composite anode material is 3.0% to 6.0%;

n. the pH of the silicon-oxygen composite anode material is 10.0 to 12.0.

7. A method for preparing a silicon-oxygen composite anode material, comprising:

mixing a precursor with a pre-lithiated carbon-coated silicon-oxygen material, and carrying out a solid-phase thermal reaction in a protective atmosphere to obtain the silicon-oxygen composite anode material; wherein the precursor comprises at least one of a mixture of a phosphate containing ionic compound and a metal compound, a metal phosphates, a mixture of a silicate containing ionic compound and a metal compound, and a metal silicate; the silicon-oxygen composite anode material comprises a silicon-oxygen material and a composite coating layer formed on the surface of the silicon-oxygen material; the composite coating layer comprises a carbon material and a lithium-containing compound, the carbon material has pores, and the lithium-containing compound is filled in the pores, wherein the lithium-containing compound comprises at least one of multi-lithium phosphate, multi-lithium silicate, and multi-lithium-containing metal oxide, wherein the multi-lithium phosphate comprises $Li_xR_yM_2PO_4$, wherein R is at least one selected from the group consisting of Mg, V and Cr, and M is at least one selected from the group consisting of Al, Sc, Ti, Cu, Zn, Y, Mo, Nb, La and Zr, $0.3 \leq x \leq 1.2$, $0.5 \leq y \leq 1.0$, $0 \leq z \leq 0.2$; the multi-lithium silicate comprises $Li_xR_yM_2SiO_4$, wherein R is at least one selected from the group consisting of Mg, V and Cr, and M is at least one selected from the group consisting of Al, Sc, Ti, Cu, Zn, Y, Mo, Nb, La and Zr, $0.8 < x \leq 2.2$, $0.8 \leq y \leq 1.2$, $0 \leq z \leq 0.2$; and the multi-lithium-containing metal oxide comprises $Li_xR_yM_2O_2$, wherein R is at least one selected from the group consisting of Al, V and Cr, and M is at least one selected from the group consisting of Mg, Sc, Ti, Cu, Zn, Y, Mo, Nb, La and Zr, $0.3 \leq x \leq 0.7$, $0.2 \leq y \leq 5$, $0 \leq z \leq 0.2$.

8. The method according to claim 7, wherein the pre-lithiated carbon-coated silicon-oxygen material is obtained by the reaction of a carbon-coated silicon-oxygen material with a lithium source.

9. The method according to claim 8, wherein the method satisfies at least one of the following conditions a to e:

a. the lithium source comprises at least one of lithium hydride, alkyl lithium, metal lithium, lithium aluminum hydride, lithium amide, and lithium borohydride;

b. the reaction temperature between the carbon-coated silicon-oxygen material and the lithium source is 150° C. to 300° C.;

c. the reaction time between the carbon-coated silicon-oxygen material and the lithium source is 2.0 h to 6.0 h;

d. the mass ratio of the carbon-coated silicon-oxygen material to the lithium source is 1:(0.01-0.20);

e. the mass percentage content of lithium in the pre-lithiated carbon-coated silicon-oxygen material is 1.0% to 20.0%.

10. The method according to claim 8, wherein the method also comprises coating the silicon-oxygen material with carbon to obtain the carbon-coated silicon-oxygen material.

11. The method according to claim 10, wherein the method satisfies at least one of the following conditions a to e:

a. the chemical formula of the silicon-oxygen material is $SiO_n$, wherein $0.5 \leq n \leq 1.5$;

b. the average particle size of the silicon-oxygen material is 3.5 μm to 8.0 μm;

c. the thickness of the carbon coating layer on the surface of the silicon-oxygen material is 1 nm to 150 nm;

d. the carbon coating comprises gas-phase carbon coating, the conditions for gas-phase carbon coating are as follows: raising the temperature of the silicon-oxygen material to 600° C. to 1000° C. under protective atmosphere, feeding organic carbon source gas, keeping the temperature for 0.5 h to 10 h and then cooling down; wherein, the organic carbon source gas comprises hydrocarbons, and the hydrocarbons comprises at least one of methane, ethylene, ethyne, and benzene;

e. the carbon coating comprises solid-phase carbon coating, the conditions for solid-phase carbon coating are as follows: after 0.5 h to 2 h of the fusion of the silicon-oxygen material with a carbon source, carbonizing the obtained carbon mixture under the temperature of 600° C. to 1000° C. for 2 h to 6 h and then cooling down; wherein, the carbon source comprises at least one of polymer, saccharides, organic acid and pitch.

12. The method according to claim 7, wherein the method satisfies at least one of the following conditions a to i:

a. the phosphate containing ionic compound is at least one selected from the group consisting of phosphoric acid, phosphate and metaphosphate;

b. the silicate containing ionic compound is at least one selected from the group consisting of silicic acid, silicate and silicon dioxide;

c. the metal compound comprises metal oxides and/or soluble metal salts;

d. the molar ratio of the phosphate containing ionic compound to the metal compound is 1:(0.05 to 1.20);

e. the molar ratio of the silicate containing ionic compound to the metal compound is 1:(0.05 to 1.20);

f. the conditions for obtaining the mixture of the phosphate containing ionic compound and the metal compound or the mixture of the silicate containing ionic compound and the metal compound are as follows: controlling the mixing temperature to be 20° C. to 80° C., and the mixing time to be 3 h to 6 h;

g. the conditions for obtaining the mixture of the phosphate containing ionic compound and the metal compound or the mixture of the silicate containing ionic compound and the metal compound are as follows: dispersing the mixture by at least one of ultrasonic dispersion, stirring dispersion, and wet ball-milling dispersion;

h. the average particle size of the precursor particles is 1 nm to 400 nm;

i. the average particle size of the precursor particles is 1 nm to 50 nm.

13. The method according to claim 7, wherein the method satisfies at least one of the following conditions a to l:

a. the steps of mixing a precursor with the pre-lithiated carbon-coated silicon-oxygen material comprises: disperse the precursor in a solvent to form a suspension, then add the pre-lithiated carbon-coated silicon-oxygen material to the suspension, disperse adequately and remove the solvent;

b. the method of dispersing adequately is wet ball-milling dispersion;

c. the mass ratio of the precursor to the pre-lithiated carbon-coated silicon-oxygen material is (0.005 to 0.1): 1;

d. the mass ratio of the added solvent to the sum of the precursor and the pre-lithiated carbon-coated silicon-oxygen material is 0.3 to 1.0;

e. the solvent comprises at least one of ethyl alcohol, acetone, dioctyl ether, hexadecane, tetraethylene glycol dimethyl ether, and trioctylamine;

f. the protective atmosphere comprises at least one of nitrogen, helium, neon, argon, krypton and xenon;

g. the temperature of the solid-phase thermal reaction is 500° C. to 1300° C.;

h. the temperature of the solid-phase thermal reaction is 700° C. to 1050° C.;

i. the time for the solid-phase thermal reaction is 0.5 h to 12 h;

j. the time for the solid-phase thermal reaction is 3 h to 10 h;

k. the heating rate of the solid-phase thermal reaction is 1° C./min to 5° C./min;

l. The method also comprises: screening the products of the solid-phase thermal reaction, to obtain the silicon-oxygen composite anode material, wherein the screening comprises at least one of crushing, ball milling, filtering, or pneumatic classification.

\* \* \* \* \*